INVENTOR
HUGO C. RASSMANN
BY
ATTORNEY

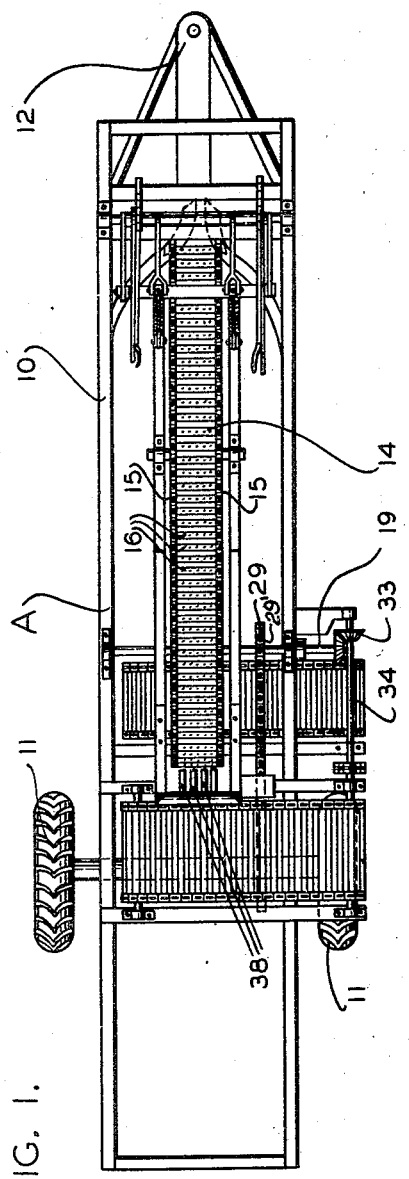
March 16, 1948.     H. C. RASSMANN     2,437,709
SUGAR BEET HARVESTER
Filed Aug. 14, 1944     3 Sheets-Sheet 1
INVENTOR
HUGO C. RASSMANN
BY
ATTORNEY

March 16, 1948.  H. C. RASSMANN  2,437,709
SUGAR BEET HARVESTER
Filed Aug. 14, 1944  3 Sheets-Sheet 3
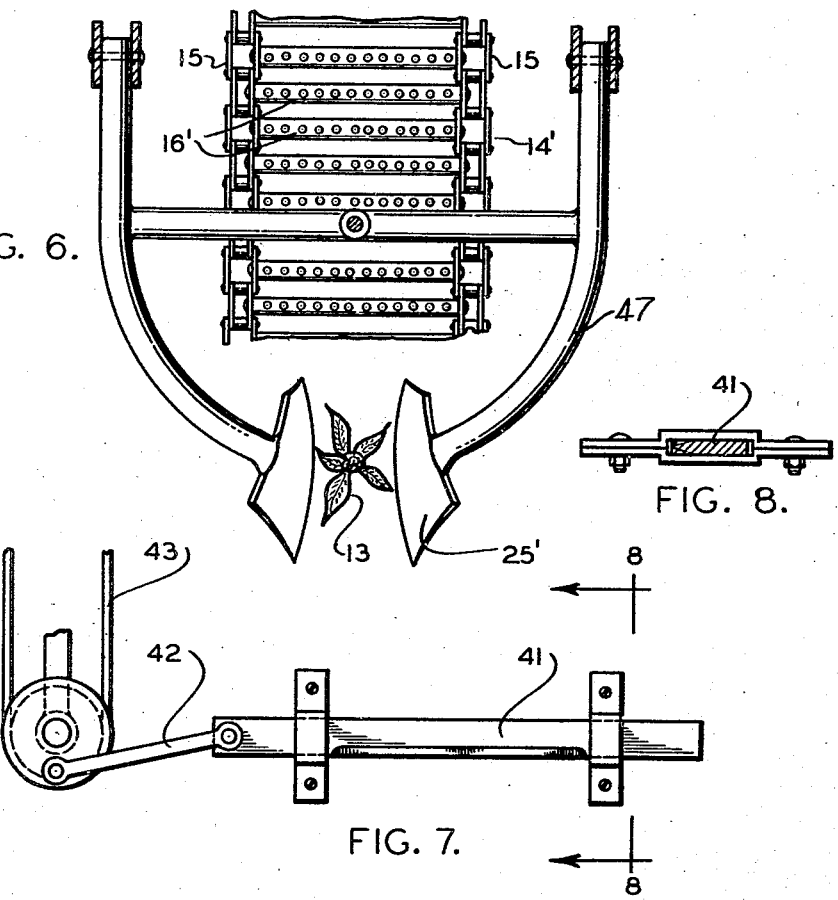
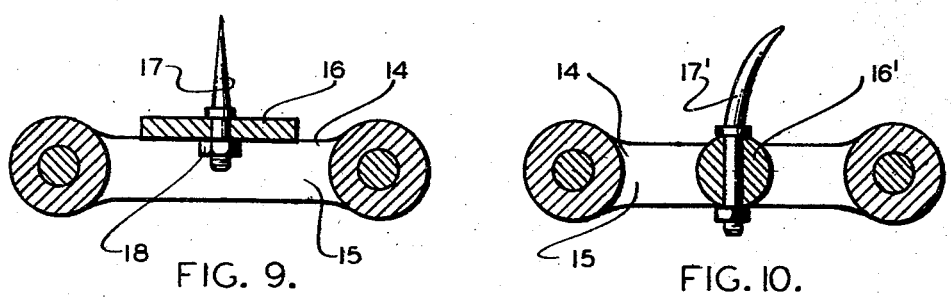
INVENTOR
HUGO C. RASSMANN
BY
ATTORNEY Patented Mar. 16, 1948

2,437,709

UNITED STATES PATENT OFFICE 2,437,709

SUGAR-BEET HARVESTER

Hugo C. Rassmann, Minneapolis, Minn.

Application August 14, 1944, Serial No. 549,355

5 Claims. (Cl. 55—108)

My invention relates to a sugar beet harvester wherein it is desirable to plow the sugar beets out of the ground sufficiently so that they can be readily engaged and picked up by an endless belt which carries the beets to a topping knife to sever the tops from the beets.

A feature resides in providing a beet harvester of a very simple character wherein an endless belt is provided for conveying the beets from the ground, after they have been plowed loose and while they are yet in an upright position, engaging them and carrying them to a conveyor belt which carries the beets to the side of the harvester where they may be discharged, or where they may be loaded into a conveyor which elevates them into a truck.

A further feature resides in providing a beet harvester wherein the harvester unit is resiliently supported on the front end and hingedly supported on the other end so that the frame carrying the harvester beet pick-up belt which engages and lifts the beets out of the ground from the furrow may be adjusted in relation to the ground, and the resilient means will permit the beet pick-up belt to be resiliently operated over the ground as the harvester travels along the beet furrow. This construction permits the pickup end of the belt to be forced upward without injuring the mechanism of the harvester.

It is also a feature to provide a harvester wherein the pick-up belt for the beets or other similar root vegetables, such as carrots, or other beets, turnips and the like, comprises a pair of spaced apart endless chains which are adapted to travel over a series of sprocket wheels. The sprocket wheels adjacent the ground are suspended from the bottom of the floating frame and are resiliently carried in the floating frame by means of the spring at the front end of the frame which is associated with the lever which sets the front end of the pick-up belt in relation to the ground. The beet conveyor belt is formed of pairs of spaced apart chains. Bars extend between the chains and are supported by the same. A series of spike-like or hook members are provided on each of the bars so that as the belt is operated in close proximity to the plows and the ground, the spikes or spike hooks are forced into the top of the beets and carry the beets up into the back of the harvesting machine where the beets are topped and the top portion of the beets with the foliage is carried on to a stripping means which strips the foliage and top which has been cut off onto a belt operating transversely of the harvester.

Furthermore, I provide a beet harvester wherein the beets are elevated out of the ground, picked up by an endless conveyor to carry the beet to the topper where the main body portion of the beet is dropped onto a transversely operating conveyor positioned beneath the rear portion of the frame of the harvester, and the endless conveyor carries the top and foliage of the beet to a stripping position where the tops and foliage are stripped from the conveyor and carried by a transverse conveyor to the side of the harvester. The conveyors carrying the beets themselves, as well as the topped-off portions, extend virtually parallel. The conveyors are operated in unison to complete the harvesting of the beets. With this simple form of beet harvester or root harvester, working mechanism can be underhung in relation to the carrying frame and thus a low point of gravity can be provided for the machine so that the same may operate close to the ground.

Furthermore, I provide a pick-up belt for the beets of a unique character, the slats of which carry the hooks of the conveyor and the conveyor virtually rolls over the tops of the beets so that the pick-up of the beets is positive, yet simple. The resilient supporting means for the floating frame permits the pick-up belt to roll closely to or over the ground, thus insuring the picking up of every beet as it is forced loose by the plow.

In the drawings forming a part of the specification:

Figure 1 is a plan view of a form of my harvester.

Figure 2 is a side elevation of the harvester shown in Figure 1.

Figure 5 is a detail of the fixed topping knife used in the harvester of Figures 1 and 2.

Figure 6 is a detail plan of a portion of the harvester shown in Figures 3 and 4.

Figure 7 is a detail of the topping knife used on the harvester shown in Figures 3 and 4.

Figure 8 is a section on the line 8—8 of Figure 7.

Figure 9 is a detail of one of the links of the endless chain for the beet elevator of the harvester showing the transverse bar which carries the spiking elements.

Figure 10 is a similar view to Figure 9 showing the spiking elements in a hook formation.

Figure 3:
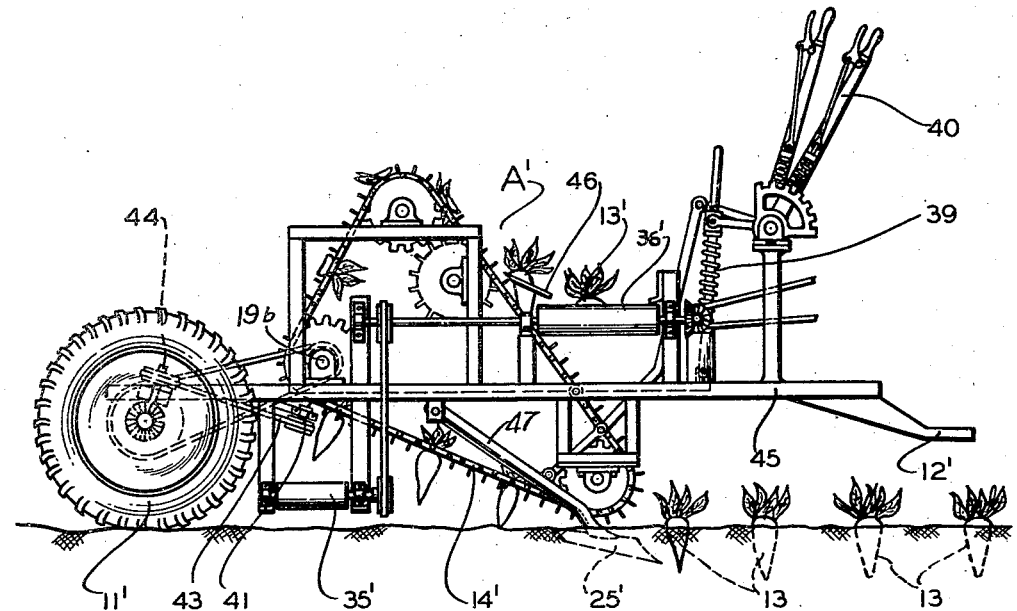
Figure 3 is a side elevation of an alternative form of my harvester.

In the drawings I have illustrated in Figures 1 and 2 a plan and side elevation of the preferred form of my beet harvester A. In this form of harvester, the frame 10 is of a rigid type, being made of angle iron and other suitable material to form a rigid frame which is supported at the rear by the traction or carrier wheels 11. The forward end of the frame 10 is provided with a drawtongue 12 which is adapted to be connected to a tractor (not illustrated in the drawings).

The harvester A is of a simple construction and is adapted to be provided with a beet elevating pick-up belt or conveyor 14. The conveyor or elevator 14 is made up of two or more endless chains 15 which are spaced apart by a series of transversely extending bars 16.

The bar 16 may be flat as illustrated in Figure 9 and connected with the links of the chain 15 in any suitable manner. The bars 16 are adapted to carry beet spiking elements 17, which may be in the form of a comparatively straight spike, which are held replaceable by the nuts 18 to lock the spikes 17 in the bar 16. Several spikes 17 may be anchored in the bar 16, and it is apparent that the bar 16 may be as long as is desired to space the chains 15 apart and provide the slat-like bars 16 to form the supporting means for the spikes 17.

The endless chains 15 may be in the form illustrated in Figure 10 and rod-like bars 16' may be connected to the links of the chain to space the chains apart. In this form, the spikes 17' may be curved to form hook-like spikes which are adapted to hook into the head of the beet and through the foliage thereof, so that as the endless belt-like conveyor 14 is operated over the tops of the beets 13, the spikes 17 or the spike hooks 17' are adapted to be driven into the head of the beet through the foliage so that the beet may be elevated out of the ground as the conveyor 14 operates.

The coveyor 14 may be hingedly supported on the shaft 19 at the rear end of the conveyor. The forward end of the conveyor operates over the sprockets which are mounted on the shaft 20 held by the free end 21 of the floating frame 21a which supports the conveyor.

The forward end 21 of the conveyor frame is adapted to be floatingly and resiliently supported through the medium of the spring 22 which is connected to the adjusting link 23 adapted to be operated by the lever 24 which raises and lowers the front end 21 of the frame of the conveyor 14. The setting lever 24 is held in position by the conventional quadrant and latch means.

I provide a pair of plows 25 which are supported by the arms 26 which are hinged at 27 to the rigid frame 10 of the harvester A. The plows 25 are connected by the links 26' and 27' to the hand adjusting lever 28. With this adjusting means for the plows 25, the same can be set into the proper position to loosen the ground around the beets 13 as the harvester A is drawn along the row of beets by the tractor.

The beets are adapted to be plowed loose in the ground in a manner so that as the beets are plowed loose, the conveyor 14 drives the spikes 17 simultaneously into the head of the beet and through the foliage and thus as the conveyor is operated, the beets are lifted out of the ground as illustrated in Figure 2.

The conveyor or pick-up belt 14 may be driven by the traction wheels 11 through the medium of the chains 29 and sprocket 29', as illustrated in Figures 1 and 2. This will operate shaft 19 to operate the drive sprockets 19' which in turn operate the conveyor 14 over the idle sprockets 30, 31 and 32.

The traction wheels 11 may also operate through the gears 33 and the shafts 19 and 34, a pair of endless conveyors 35 and 36.

It is also apparent that the mechanism, including the conveyor 14, may be operated from a power take-off (not shown) which would be connected to the tractor (not shown).

The free end of the conveyor 14, which is adjusted by the lever 24, and which is resiliently held through the coil spring connection 22, is adapted to roll, so as to speak, over the tops of the beets, as illustrated in Figure 2, simultaneously with the loosening of the beets by the plows 25. The spikes 17 on the conveyor 14 are driven into the head of the beet 13, directly under the conveyor, and as the conveyor travels on its underside in a backward direction, the beets are elevated out of the ground and carried into contact with the angularly disposed fixed topping knife 37 which cuts off the crown, or head, of the beet with the foliage, causing the body of the beet to fall on the conveyor 35. The crown and foliage of the beet 13' is carried by the conveyor 14 to the stripping means 38, which is made up of a series of arms which project between the spikes 17 or spike hooks 17' and are adapted to strip the crown 13' with the foliage from the conveyor 14. As the crown 13' and the foliage fall from the stripper, they drop upon the conveyor 36.

The conveyors 35 and 36 are illustrated extending transversely of the harvester A and are adapted to operate in unison in the same direction to carry the beets 13 and the tops 13' to one side of the machine. It is apparent, however, that the conveyors 35 and 36 may extend longitudinally of the harvester A or in any direction desired. It is also apparent that elevator conveyor means may be provided for the topped beets and for the crown and foliage of the beets. However, such elevating conveyors are not illustrated in the drawing.

My beet harvester is adapted to harvest ordinary beets, carrots, rutabagas, or any other similar vegetable, and parts may be adjusted according to the vegetable to be harvested.

In Figures 3, 4, 6, 7 and 8, I have illustrated an alternative form of my beet harvester A', together with the details thereof. In the beet harvester illustrated in side elevation and in plan view, Figures 3 and 4, I have shown the pick-up belt or lifting conveyor 14' supported by the floating frame 21b which is resiliently mounted on a spring adjusting rod 39 and which is adapted to be adjusted by the hand lever 40 with its conventional quadrant and latch means to set the conveyor in the desired relation to the ground, so that the conveyor 14' will travel over the tops of the beets 13 and drive the spikes 17 or 17' into the crown of the beet. The floating frame 21b is pivoted on shaft 19b which receives power from traction wheels 11' and carries the sprocket of conveyor 14'.

In this harvester A', I have a transverse conveyor 35' located directly below the topping knife 41. The topping knife 41 is adapted to be operated by the pitman rod 42 and a belt 43 which is driven by the shaft 44.

The traction wheels 11' operate the topping knife 41 and also the conveyor 14'.

The harvester A' is provided with an endless belt carrier 36' which is located at the forward end of the rigid frame 45. A stripping mechanism 46 is located in the path of the conveyor 14' adjacent the conveyor 36' so that the crown 13' with the foliage is adapted to be removed from the conveyor 14' and discharged on the conveyor 36. The harvester A' is provided with a tractor hitch 12'.

Each of the harvesters A and A' is formed of a simple construction and is properly adapted to be attached by the tongues 12 and 12' to an operating tractor of any suitable nature. However, it is apparent that the harvesters A and A' may be provided with a motor (not shown) for propelling and operating the harvesters. Where the harvesters are equipped with self-propulsion, the ordinary steering wheels (not shown) may be attached in place of the tongue 12 or 12'.

Tractor A' is provided with the yoke arms 47 which support the plows 25' which are provided for loosening the beets 13 in the furrow as the harvester travels along the ground. The conveyor 14' is provided with the side chains 15' which extend between the bars 16 or 16' which carry the spike hooks 17'.

Figure 4:
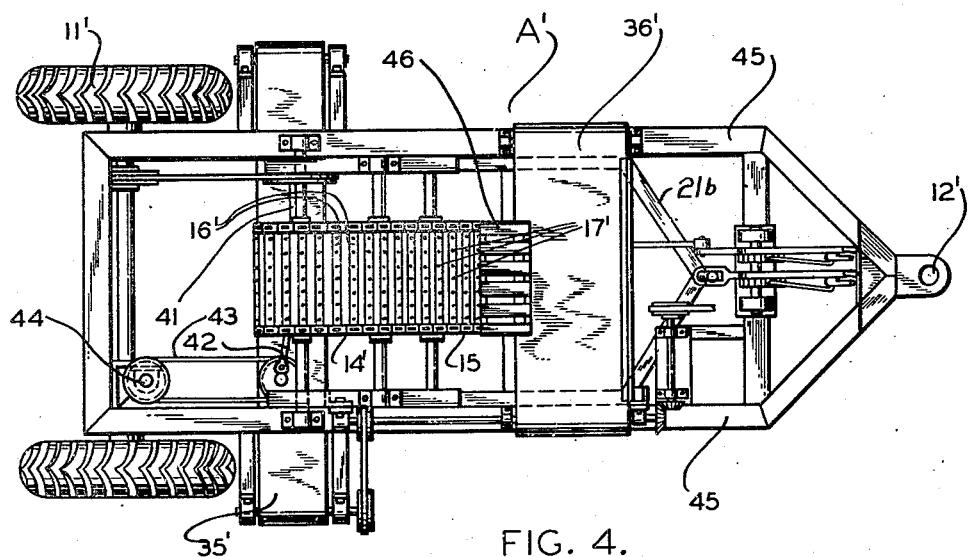
Figure 4 is a plan view of the harvester illustrated in Figure 3.

The harvesters may be made in the type illustrated in Figures 1 and 2 or as illustrated in Figures 3 and 4, and the design of construction may be varied to carry out the principle heretofore set forth within the scope of the following claims without departing from the spirit or intent of the invention herein described.

I claim:

1. A beet harvester, including a main rigid frame adapted to be supported by carrier wheels, a floating frame hingedly supported on one end in said main rigid frame and freely disposed on the other end to be operated in a manner to raise and lower the same, resilient means connected with the front end of the floating frame to resiliently support the same, lever and quadrant means for setting the free end of said frame in relation to the ground, an endless pick-up belt formed by a series of endless chains traveling over a series of sprocket wheels on the floating frame, a series of bars extending between said chains, each bar carrying a series of pick-up hooks, which endless belt is adapted to roll over the tops of the beets to pick them up as they are plowed loose, a topping knife mounted adjacent said belt, a transversely extending carrier belt extending below said topping knife for carrying the topped beets to one side of the harvester, a stripping device for removing the tops and foliage of the beets from said endless pick-up belt, and a transversely extending conveyor for carrying the tops and foliage of the beet to one side of the harvester.

2. A beet harvester, comprising a main rigid frame, ground wheels for supporting said frame, a floating frame hingedly supported on the rear end of said rigid frame and having its free end resiliently supported to a setting lever which is locked in a set position by a quadrant and latch means, an adjustable plow means carried by said main frame, an endless beet carrying belt carried by said floating frame, said belt having links and chains supported by a series of bars carried by the links and spacing the chains apart, each bar having a series of spike-like means adapted to engage into the top of the beets as said belt travels over the tops of the beets after the beets have been plowed loose, beet topping means, stripping means mounted adjacent said belt for removing the tops and foliage from said belt, and conveyor means below said topping means and below said stripping means adapted to be operated in unison to carry the topped beets and the tops or the foliage to one side of said harvester as the same travels along the row of beets.

3. A beet harvester comprising a floating frame hinged on one end and resiliently supported in an adjustable manner on the other end, an adjustable plow adapted to plow the beets in a furrow loose from the ground, a main rigid frame supported by ground wheels adapted to support said floating frame, said plow being carried by said main frame, an endless beet harvesting belt comprising chains carried by said floating frame and having a slat-like formation between the chains of said belt, each slat being adapted to carry spike-like hooks which pierce into the top of the beets in a manner to engage the beet and lift it from the ground, a topping means mounted adjacent said belt and adapted to cut the body of the beet from the top and foliage, a top and foliage stripping means positioned in the path of said belt beyond said topping means, and endless belts operated in unison and associated with said topping means and said stripping means to carry the beets and the foliage with the top to the side of said harvester as the same travels along a row of beets.

4. A harvester for sugar beets and the like, comprising a rigid frame, means for connecting said frame to a tractor, a beet elevator means floatingly supported on one end within said rigid frame, means adjusting the floating end of said elevator, means hingedly supporting one end of said elevator, said elevator including a series of endless chains between which bars are extended, and secured to the links of said chains, spike-hook members projecting from said bars and adapted to be forced into the head of the beets as said harvester travels over the same, means loosening the beets in the ground simultaneously with the engaging of the beets, said spike-hooks to permit the elevator to raise the beets out of the ground, a stationary angularly positioned beet topping knife for severing the body of the beet from the top and the foliage, means for stripping the top and foliage from said hooks of said elevator, and endless carriers positioned below said topping knife and said stripping means adapted to be operated in unison to carry the topped beets, as well as the foliage and top of the beet from said harvester.

5. A beet harvester, including a main rigid frame adapted to be supported by carrier wheels, a floating frame hingedly supported on one end in said main rigid frame and freely disposed on the other end to be operated in a manner to raise and lower the same, resilient means connected with the front end of the floating frame to resiliently support the same, lever and quadrant means for setting the free end of said frame in relation to the ground, an endless pick-up belt on the floating frame, said belt carrying a series of pick-up hooks, which endless belt is adapted to roll over the tops of the beets to pick them up as they are plowed loose, a topping knife mounted adjacent to and below said endless belt, a transversely extending carrier belt extending below said topping knife for carrying the topped beets to one side of the harvester, a stripping device adjacent said belt for removing the tops and foliage of the beets from said endless pick-up belt, and a transversely extending conveyor below said stripping device for carrying the tops and foliage of the beets to one side of the harvester.

HUGO C. RASSMANN.

REFERENCES CITED

The following references are of record in the file of this patent:

UNITED STATES PATENTS

| Number | Name | Date |
| --- | --- | --- |
| 1,210,057 | Fanger | Dec. 26, 1916 |
| 2,053,643 | Stoltenberg | Sept. 8, 1936 |
| 1,315,381 | Merchant | Sept. 9, 1919 |
| 1,390,261 | Adams | Sept. 13, 1921 |
| 1,288,559 | Genske | Dec. 24, 1918 |

FOREIGN PATENTS

| Number | Country | Date |
| --- | --- | --- |
| 40,792 | Denmark | Sept. 16, 1929 |